United States Patent
Damrath et al.

(10) Patent No.: US 7,000,530 B2
(45) Date of Patent: Feb. 21, 2006

(54) APPARATUS FOR COOKING EGGS WITHOUT SHELLS

(75) Inventors: Joachim Damrath, Bachhagel (DE); Dietmar Freitag, Hohndorf (DE); Siegmund Kramer, Kirchanschöring (DE); Andreas Schuffenhauer, Chemnitz (DE)

(73) Assignee: BSH Bosch und Siemens Hausgerate GmbH, Munich (DE)

( * ) Notice: Subject to any disclaimer, the term of this patent is extended or adjusted under 35 U.S.C. 154(b) by 238 days.

(21) Appl. No.: 10/237,228

(22) Filed: Sep. 3, 2002

(65) Prior Publication Data

US 2003/0033940 A1 Feb. 20, 2003

Related U.S. Application Data

(63) Continuation of application No. PCT/EP01/01846, filed on Feb. 19, 2001.

(30) Foreign Application Priority Data

Mar. 3, 2000 (DE) .......................................... 100 10 629

(51) Int. Cl.
*A47J 37/04* (2006.01)

(52) U.S. Cl. ............................. 99/427; 99/440; 99/447; 99/448

(58) Field of Classification Search .................. 99/401, 99/393, 427, 440, 447, 448, 476, 477
See application file for complete search history.

(56) References Cited

U.S. PATENT DOCUMENTS

| | | | | | |
|---|---|---|---|---|---|
| 2,042,855 A | * | 6/1936 | Merklein | ...................... | 99/422 |
| 2,490,076 A | * | 12/1949 | Maxson | ....................... | 219/400 |
| 2,646,495 A | * | 7/1953 | Dornbush | .................... | 219/391 |
| 3,103,162 A | * | 9/1963 | Scofield | ........................ | 99/427 |
| 3,227,065 A | | 1/1966 | Litman | | |
| 3,831,508 A | | 8/1974 | Wallard | | |
| 4,487,115 A | * | 12/1984 | Su | ............... | 99/327 |
| 5,203,252 A | | 4/1993 | Hsieh | | |
| 5,699,722 A | * | 12/1997 | Erickson et al. | ............... | 99/330 |
| 6,201,217 B1 | * | 3/2001 | Moon et al. | ................. | 219/386 |

FOREIGN PATENT DOCUMENTS

| | | |
|---|---|---|
| DE | 1 869 521 | 3/1963 |
| DE | 1 891 125 | 4/1964 |
| DE | 1 429 788 | 3/1970 |
| DE | 7332678 | 12/1973 |
| DE | G 86 01 030.1 | 3/1986 |
| JP | 03013733 A | 1/1991 |
| JP | 09308427 A | 12/1997 |

* cited by examiner

*Primary Examiner*—Reginald L. Alexander
(74) *Attorney, Agent, or Firm*—Laurence A. Greenberg; Werner H. Stemer; Ralph E. Locher

(57) ABSTRACT

To cook eggs without eggshells by heat radiation with no risk that the eggs are burnt on their surface by the heat radiation, an egg cooker includes a shield disposed between the egg(s) to be cooked and the heat radiation source and is not connected to the egg(s) to be cooked. Thus, the egg(s) can also be cooked in a form resembling a fried egg. Advantageously, the eggs are cooked in receptacles of a preparation dish, the shield exposing regions of the preparation dish between the receptacles to direct heat radiation. The heat absorbed at the preparation dish can be transmitted to the egg(s) through a heat-conducting connection between the preparation dish and the receptacles to accelerate the cooking process.

17 Claims, 2 Drawing Sheets

APPARATUS FOR COOKING EGGS WITHOUT SHELLS

CROSS-REFERENCE TO RELATED APPLICATION

This application is a continuation of copending International Application No. PCT/EP01/01846, filed Feb. 19, 2001, which designated the United States and was not published in English.

BACKGROUND OF THE INVENTION

Field of the Invention

The invention relates to an apparatus for cooking eggs without eggshells by heat radiation.

To cook eggs in their shells, conventionally, the eggs are cooked in a hot water bath or in a steam atmosphere. In addition, German Published, Non-Prosecuted Patent Application DE 1 429 788, German Utility Model DE 733 36 78 U1, German Utility Model DE 1 869 521 U1, German Utility Model DE 1 891 125 U1, and U.S. Pat. No. 3,227,065 to Litman disclose egg cookers in which the eggs are cooked by a heating device giving off radiant heat or convective heat. Eggs without shells are customarily cooked in pans or other vessels that are heated externally and the heat is passed on to the egg contents present therein. Thus, U.S. Pat. No. 5,203,252 to Hsieh discloses a bread toaster having additional functions in which a half-rounded pan-like dish can be heated from beneath. This prior art process has the disadvantage, in particular, that the time required for cooking can be relatively long until the heat is transferred to the vessel for holding the egg and the egg present therein. In addition, U.S. Pat. No. 3,831,508 to Wallard discloses vessels for eggs without shells that completely surround the eggs and in which they can be heated in an oven, a bread toaster, or in boiling water. However, in the case of the vessels completely surrounding the eggs, there is the disadvantage that the egg, during cooking, on all sides abuts a wall and, thus, adopts a shape that appears unnatural and disadvantageous compared with eggs prepared in vessels open at the top.

SUMMARY OF THE INVENTION

It is accordingly an object of the invention to provide an apparatus for cooking eggs without shells that overcomes the hereinafore-mentioned disadvantages of the heretofore-known devices of this general type and that prepares the eggs rapidly and with a pleasing shape.

With the foregoing and other objects in view, there is provided, in accordance with the invention, an apparatus for cooking eggs without eggshells by heat radiation, including a preparation dish having a top and at least one receptacle open at the top for receiving egg contents, and a shield connected to the preparation dish at a distance above the at least one receptacle and shielding the egg contents to be cooked from direct heat radiation.

According to the invention, an apparatus has a shield that shields the egg contents to be cooked from direct heat radiation and does not come into contact with the egg contents to be cooked. The shield can be connected to the preparation dish such that the shield is situated at a sufficient distance above the at least one receptacle and, thus, shields the egg contents in the receptacle against the heat radiation generally coming from above. Heat-insulating or heat-conducting substances can be used as material for the shield, where, in the case of a good heat-conducting material, for example, metal, the absorbed heat radiation can be, to a certain extent, transmitted downward to the egg contents. The heat transferred to the egg contents can be influenced through the choice of material and thickness of the shield, in accordance with the heat radiation used and conditions in the egg cooking apparatus. The receptacle of the preparation dish can be formed, for example, by ridges mounted on the preparation dish or by a small dish mounted on the preparation dish.

In accordance with another feature of the invention, the preparation dish can also be configured such that the receptacle covers only a part of the dish and the shield exposes the part not covered by the receptacle at least in part to direct heat radiation. As such, the heat transferred to the egg contents can be increased, by direct heat radiation being transmitted to the regions of the preparation dish next to the egg contents, but, nevertheless, avoiding burning of the egg contents on the surface by direct heat radiation. Advantageously, the part of the preparation dish that is not covered by the receptacle is in heat-conducting connection with the bottom of the receptacle. As such, the heat that is absorbed by the regions of the preparation dish next to the egg contents is transmitted from below to the egg contents to accelerate the cooking process. Preferably, the direct heat radiation originates from above the receptacle.

In accordance with a further feature of the invention, to form the bottom of the receptacle, a part of the preparation dish can be used so that a cost advantage can be achieved and the heat from edge regions that may be present is transmitted better into the bottom of the receptacle. In a particularly simple embodiment, the receptacle is formed as a recess in the preparation dish.

In accordance with an added feature of the invention, in the case of an egg cooker having an apparatus according to the invention, a heat radiation source can be disposed at the top that radiates downward onto a preparation dish disposed beneath, which preparation dish is moved to pass underneath the heat radiation source by, in particular, a rotary drive disposed above, the shield being disposed between the heat radiation source and the preparation dish. Rotating the preparation dish, in particular, together with the shield, can result in the fact that a relatively large preparation dish, in particular, having a plurality of receptacles, can also be heated by a small and inexpensive heat radiation source. The heat radiation source used can be, advantageously, commercially conventional and inexpensive lamps, for example, halogen bulbs or halogen rods.

In accordance with an additional feature of the invention, the shield is removably connected to the preparation dish.

In accordance with yet another feature of the invention, the preparation dish is round, the at least one receptacle is a plurality of receptacles disposed along a circular path, and the shield is removably and rotationally fixedly connected to the preparation dish and has vanes each associated with a respective one of the receptacles.

In accordance with yet a further feature of the invention, the shield can have vanes that are assigned to the receptacles of the preparation dish, the shield being connectable to the preparation dish in a rotationally fixed manner to ensure shielding of the individual receptacles by the assigned vanes. The heat radiation can heat the preparation dish directly between the individual vanes, which accelerates the cooking process. If the preparation dish is in heat-conducting connection with the receptacles, and, in particular, if the receptacles are constructed as recesses in the preparation dish, the heat is advantageously passed from the edge regions of the preparation dish that are heated directly by the heat radiation to the bottoms of the receptacles and, thus, to the egg contents. The vanes of the shield can be made foldable to facilitate the accessibility of the preparation dish lying beneath and of the egg contents present therein.

In addition, the shield can have one or more eyes or breakthroughs into which an elongate object, for example, a spoon handle, can be introduced and with which the shield can be taken off. As such, a user can take off the heated shield without having to contact the shield by hand.

In accordance with yet an added feature of the invention, the preparation dish and the shield can be removable, in which case, in addition, in the egg cooker, alternatively to the preparation dish and the shield,-a device for turning eggs with shells can be used, which can also be driven by the rotary drive. For such a purpose, the rotary drive can be provided with a coupling piece through which not only the preparation dish and the shield but also the device for turning eggs with shells can be driven. The device for turning eggs with shells can be formed, for example, by a disk with breakthroughs in which the eggs are held and that is conducted in a rotary motion over turning ribs that are disposed in a star shape. Accordingly, the sections of the eggs projecting below the disk within the breakthroughs are conducted against the upper edges of the turning ribs are somewhat lifted thereby within the breakthroughs and roll over the turning ribs. In such an egg turning device configuration, the eggs are rotated by rolling over the turning ribs and are simultaneously moved in a circular path within the egg cooker so that the individual eggs are moved successively beneath the heat radiation source.

With the objects of the invention in view, there is also provided an apparatus for cooking eggs without eggshells by heat radiation, including an upper housing part, a lower housing part, a preparation dish having a top and at least one receptacle open at the top for receiving egg contents, a shield connected to the preparation dish at a distance above the at least one receptacle and shielding the egg contents to be cooked from direct heat radiation, and the preparation dish and the shield removably disposed in the lower housing part.

With the objects of the invention in view, there is also provided an apparatus for cooking eggs without eggshells by heat radiation, including an upper housing part, a lower housing part, a preparation dish having a top and at least one receptacle having a bottom; the at least one receptacle open at the top for receiving egg contents, covering only a portion of the preparation dish, and the bottom of the at least one receptacle heat-conductively connected to at least one portion of the preparation dish not covered by the at least one receptacle, a shield removably connected to the preparation dish at a distance above the at least one receptacle, the shield shielding the egg contents to be cooked from direct heat radiation originating from above the at least one receptacle and at least partially exposing the at least one portion of the preparation dish not covered by the receptacle to direct heat radiation originating from above the at least one receptacle, and the preparation dish and the shield removably disposed in the lower housing part.

Other features that are considered as characteristic for the invention are set forth in the appended claims.

Although the invention is illustrated and described herein as embodied in an apparatus for cooking eggs without shells, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
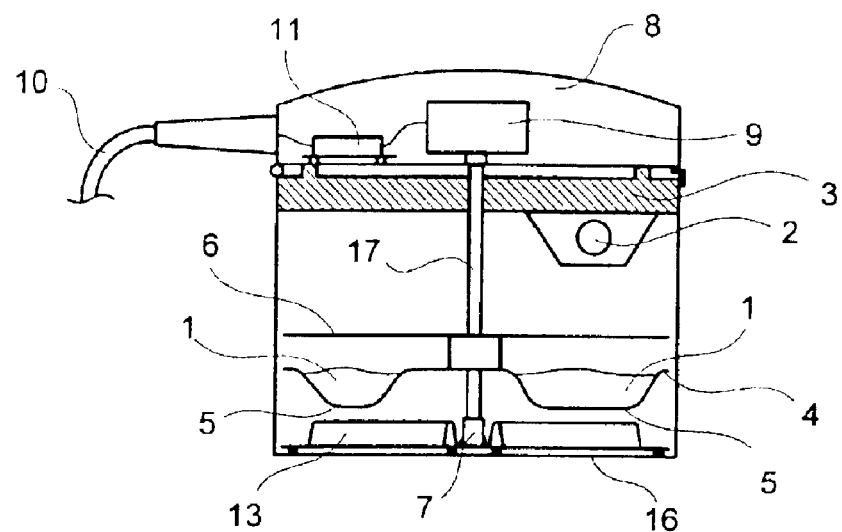
FIG. 1 is a fragmentary, cross-sectional view through an egg cooker according to the invention having an insert for cooking eggs without shells.
Figure 4:
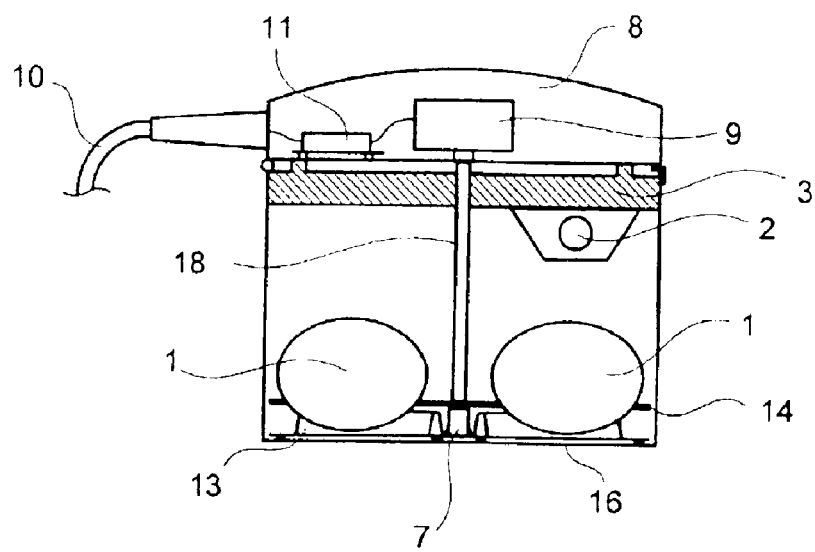
FIG. 4 is a fragmentary, cross-sectional view through an egg cooker according to the invention having a device for turning eggs with shells.

Referring now to the figures of the drawings in detail and first, particularly to FIGS. 1 and 4 thereof, there is shown an egg cooker having a lower housing part 16 in which the eggs 1 to be cooked with or without shells are disposed and an upper housing part 8. The upper housing part 8 includes an electrical connecting cable 10 for the electrical power supply, a heat radiation source 2 in the form of a halogen rod, a rotary drive 9, a control device 11 for the heat radiation source 2 and for the rotary drive 9, and heat insulation 3 disposed between the heat radiation source 2 and the remaining electrical components 9, 10, 11. The axle of the rotary drive 9 has a coupling piece that can be pushed on various axles and can drive the axles in a rotary direction.

FIG. 1 shows the egg cooker in the configuration for preparing eggs 1 without shells. Below at the bottom of the lower housing part 16 is disposed a lower turning part 13, which is formed by a round disk having turning ribs disposed thereupon in a star shape and a bearing bushing 7 that is disposed in the center of the turning ribs and is open at the top. Above the lower turning part 13 is disposed a preparation dish 4 in which receptacles 5 are formed as recesses for receiving eggs 1. In addition, an axle or shaft 17 is fixed in the center of the circular preparation dish 4. The axle 17 is mounted in the bearing bushing 7 by its downward projecting end. A shield 6 is mounted onto the end of the axle 17 projecting above the preparation dish 4. The shield 6 is formed by three vanes 12 corresponding to the three receptacles 5 in the preparation dish 4 that are fixed through their roots to a hub that ensures sufficient spacing of the vanes 12 from the eggs 1 and a rotationally fixed connection of the shield 6 to the preparation dish 4 such that a vane 12 is situated above each receptacle 5. Alternatively, the vanes 12 can be foldable, as indicated by the dashed line about the hub. For such connection, the axle 17 can have a cross-section in the form of a regular polygon having a number of corners corresponding to the number of receptacles 5 and the hub can have a breakthrough having a corresponding cross-section to be able to produce a positive lock between the hub and axle 17.

The upper end of the axle 17 is constructed such that the coupling piece of the axle can be pushed onto the rotary drive 9 and the rotary drive 9 drives the axle 17 in a rotation direction. The rotationally fixed connection between the rotary drive 9 and the axle 17 is automatically detached or made when the upper housing part 8 is folded open or folded shut, respectively, or is entirely removed from the lower housing part 16.

To cook eggs 1 without shells, the upper housing part 8 is folded open or taken off, the preparation dish 4 together with the shield 6 on the axle 7 is taken out, and the eggs 1 to be cooked are placed in the receptacles 5, in which case, to simplify the placement, the shield 6 can be taken down from the axle 17. When the preparation dish 4 together with the shield 6 is reinserted into the lower housing part 16 and the upper housing part 8 is folded down or put back, the rotationally fixed connection between the axle 17 and the rotary drive 9 is made. To cook the eggs 1, the heat radiation source 2 and the rotary drive 9 are turned on so that the receptacles 5, together with the vanes 12 of the shield 6 lying above them, are slowly rotated to pass beneath the heat radiation source 2, the eggs 1 being shielded from direct heat radiation by the shield 6. In particular, the vanes 12 and the regions of the preparation dish 4 lying between the vanes 12 and below them are exposed directly to the heat radiation. The heat absorbed here by the preparation dish 4 is passed within the material of the preparation dish 4, which is, in particular, a good heat-conducting metal, to the receptacles 5. The heat absorbed by the vanes 12, which also can be made of a good heat-conducting material, is transmitted downward to the eggs 1 by heating the air and, to a small extent, by heat radiation.

For controlling the cooking process, it is possible for the heat radiation source 2 to not be in operation for the whole period, and the eggs 1, when the egg cooker is closed and heat radiation source 2 is turned off, to still be cooking for a certain time in a further cooking phase. During the further cooking phase, the rotary drive 9 can be on or off.

Figure 2:
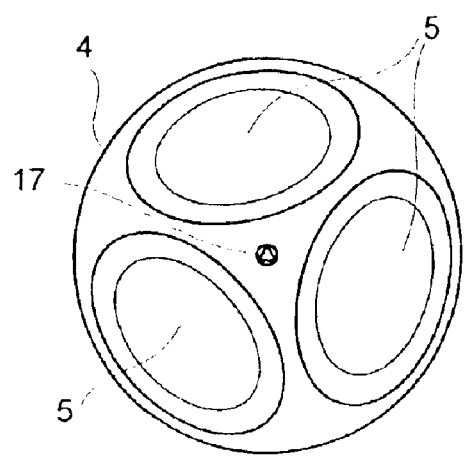
FIG. 2 is a plan view of a preparation dish of FIG. 1 for cooking eggs without shells.
Figure 3:
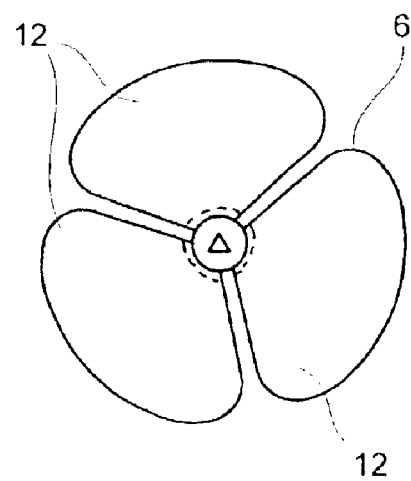
FIG. 3 is a plan view of a shield of FIG. 1.

FIG. 2 shows the preparation dish 4 having the oval receptacles 5 for receiving the eggs 1, which receptacles are disposed on a circular path. FIG. 3 shows the shield 6 having the vanes 12 fixed to the hub.

FIG. 4 shows the egg cooker together with the parts necessary for cooking the eggs 1 with eggshells. Again, the lower turning part 13 is disposed in the lower housing part 16. However, in such a configuration, an axle or shaft 18 of an egg carrier 14 is mounted in the bearing bushing 7 of the lower turning part 13. The egg carrier 14 includes, in addition to the axle 18, a round disk having breakthroughs 15 in which the eggs 1 are held such that they project downward. The distance of the egg carrier 14 from the lower turning part 13 is dimensioned so that when the egg carrier 14 rotates, the eggs 1 are conducted by their sections projecting beneath against the turning ribs 19 on the lower turning part 13 to be elevated by the turning ribs 19 and, within the breakthroughs 15, roll over the turning ribs 19. As such, on rotating the egg carrier 14, the eggs 1 are rotated about their longitudinal axis and moved on a circular path beneath the heat radiation source 2.

Figures 5, 6:
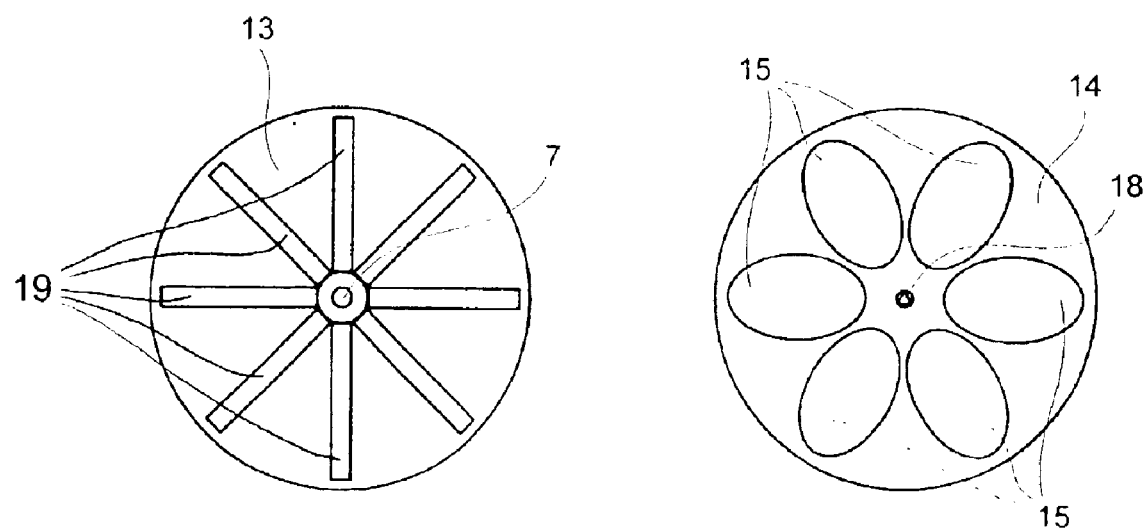
FIG. 5 is a plan view of a lower part of the device of FIG. 4 for turning eggs with shells.
FIG. 6 is a plan view of an upper part of the device of FIG. 4 for turning eggs with shells.

FIG. 5 shows the lower turning part 13 together with the turning ribs 19 disposed in a star shape and the centrally disposed bearing bushing 7. FIG. 6 shows the egg carrier 14 with the breakthroughs 15 and the axle 18 that, at its upper end has a section onto which, as in the case of the axle 17 of the preparation dish 4, the coupling piece of the rotary drive 9 can be pushed to drive the axle 18 in a rotation direction.

As in the preceding case, the rotationally fixed connection between the axle 18 and the axle of the rotary drive 9 is automatically detached or made when the upper housing part 8 is folded open (or removed) or folded shut (or placed back), respectively. The egg carrier 14 can be taken out on its axle 18 from the lower housing part 16. To cook the eggs 1, the rotary drive 9 and the heat radiation source 2 are turned on. As a result, the eggs 1 are turned by rolling over the turning ribs 19 and are moved beneath the heat radiation source 2. In such a case, after the heat radiation source 2 has been turned off, in a further cooking phase, the rotary drive 9 can remain turned on for a given additional time to turn and move the eggs 1 further.

Advantageously, the control device 11 gives an optical and/or acoustic signal at the end of the process of cooking the eggs 1 either with or without shells, to require that the eggs 1 be removed and, if appropriate, also cooled.

We claim:

1. An apparatus for cooking eggs without eggshells by heat radiation, comprising:

a preparation dish having a top and at least one receptacle open at said top for receiving egg contents;

a heat radiation source disposed above said preparation dish, said heat radiation source radiating heat towards the egg contents;

a shield connected to said preparation dish at a distance above said at least one receptacle and shielding the egg contents to be cooked from direct heat radiation;

said heat radiation source radiates heat from above said shield towards said preparation dish;

a rotary drive is disposed above said shield and is removably connected to said preparation dish and to said shield for rotating said preparation dish together with said shield.

2. The apparatus according to claim 1, wherein:

said receptacle covers only a portion of said preparation dish; and said shield at least partially exposes at least one portion of said preparation dish not covered by said receptacle to direct heat radiation.

3. The apparatus according to claim 2, wherein:

said receptacle has a bottom; and said portion of said preparation dish not covered by said receptacle is heat-conductively connected to said bottom of said receptacle.

4. The apparatus according to claim 1, wherein:

said receptacle has a bottom; and said bottom of said receptacle is a part of said preparation dish.

5. The apparatus according to claim 1, wherein:

said receptacle has a bottom; and said bottom of said receptacle is integral with said preparation dish.

6. The apparatus according to claim 1, wherein said receptacle is a recess in said preparation dish.

7. The apparatus according to claim 1, wherein said shield is removably connected to said preparation dish.

8. The egg cooker according to claim 1, wherein said preparation dish and said shield are removable.

9. The egg cooker according to claim 1, wherein said drive has a couple selectively driving one of:

said preparation dish and said shield; and a egg turning device for turning eggs with shells.

10. The egg cooker according to claim 9, wherein said shield has one of a breakthrough and at least one eye for removal of the eggs with an elongate article.

11. An apparatus for cooking eggs without eggshells by heat radiation, comprising:
- a preparation dish having a top and at least one receptacle open at said top for receiving egg contents;
- a heat radiation source disposed above said preparation dish, said heat radiation source radiating heat towards the egg contents;
- a shield connected to said preparation dish at a distance above said at least one receptacle and shielding the egg contents to be cooked from direct heat radiation;
- said preparation dish is round;
- said at least one receptacle is a plurality of receptacles disposed along a circular path; and
- said shield:
    - is connected in a rotationally fixed manner to said preparation dish; and
    - has vanes each associated with a respective one of said receptacles.

12. An apparatus for cooking eggs without eggshells by heat radiation, comprising:
- a preparation dish having a top and at least one receptacle open at said top for receiving egg contents;
- a heat radiation source disposed above said preparation dish, said heat radiation source radiating heat towards the egg contents;
- a shield connected to said preparation dish at a distance above said at least one receptacle and shielding the egg contents to be cooked from direct heat radiation;
- said preparation dish is round;
- said at least one receptacle is a plurality of receptacles disposed along a circular path; and
- said shield:
    - is removably and rotationally fixedly connected to said preparation dish; and
    - has vanes each associated with a respective one of said receptacles.

13. The egg cooker according to claim 12, wherein said vanes are foldable.

14. An apparatus for cooking eggs without eggshells by heat radiation, comprising:
- an upper housing part;
- a lower housing part;
- a preparation dish having a top and at least one receptacle open at said top for receiving egg contents;
- a heat radiation source disposed above said preparation dish, said heat radiation source radiating heat towards the egg contents;
- a shield connected to said preparation dish at a distance above said at least one receptacle and shielding the egg contents to be cooked from direct heat radiation a rotary drive is disposed above said shield and is removably connected to said preparation dish and to said shield for rotating said preparation dish together with said shield; and
- said preparation dish and said shield removably disposed in said lower housing part.

15. An apparatus for cooking eggs without eggshells by heat radiation, comprising:
- an upper housing part;
- a lower housing part;
- a preparation dish having:
    - a top; and
    - at least one receptacle having a bottom; said at least one receptacle:
        - open at said top for receiving egg contents;
        - covering only a portion of said preparation dish; and
        - said bottom of said at least one receptacle heat-conductively connected to at least one portion of said preparation dish not covered by said at lest one receptacle;
- a heat radiation source disposed in said upper housing part above said preparation dish, said heat radiation source radiating heat towards the egg contents;
- a shield removably connected to said preparation dish at a distance above said at least one receptacle, a rotary drive disposed in said upper housing part above said shield and being removably connected to said preparation dish and to said shield for rotating said preparation dish together with said shield;
- shielding the egg contents to be cooked from direct heat radiation originating from above said at least one receptacle; and
- at least partially exposing said at least one portion of said preparation dish not covered by said receptacle to direct heat radiation originating from above said at least one receptacle; and
- said preparation dish and said shield removably disposed in said lower housing part.

16. The egg cooker according to claim 15, wherein:
- said preparation dish is round;
- said at least one receptacle is a plurality of receptacles disposed along a circular path; and
- said shield:
    - is rotationally fixedly connected to said preparation dish; and
    - has foldable vanes each associated with a respective one of said receptacles.

17. The egg cooker according to claim 15, wherein said drive has a couple selectively driving one of:
- said preparation dish and said shield; and
- an egg turning device for turning eggs with shells.

* * * * *